(12) United States Patent
Burkhart et al.

(10) Patent No.: US 8,985,437 B2
(45) Date of Patent: Mar. 24, 2015

(54) CREATION AND MANAGEMENT OF DYNAMIC QUICK RESPONSE (QR) CODES

(71) Applicant: International Business Machines Corporation, Armonk, NY (US)

(72) Inventors: Michael J. Burkhart, Round Rock, TX (US); Michael P. Carlson, Austin, TX (US); Theodore J. L. Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/961,362

(22) Filed: Aug. 7, 2013

(65) Prior Publication Data
US 2015/0041530 A1 Feb. 12, 2015

(51) Int. Cl.
*G06F 17/00* (2006.01)
*G06K 19/06* (2006.01)

(52) U.S. Cl.
CPC .... G06K 19/06037 (2013.01); G06K 19/06112 (2013.01)
USPC .......................................................... 235/375

(58) Field of Classification Search
CPC .................. G06K 19/06037; G06K 19/06046
USPC .................. 235/375, 376, 383, 494
See application file for complete search history.

(56) References Cited

U.S. PATENT DOCUMENTS

| 5,600,119 | A  | * | 2/1997 | Dvorkis et al. | 235/462.1 |
| 8,011,583 | B2 | * | 9/2011 | Lei et al. | 235/438 |
| 2010/0235218 | A1 | | 9/2010 | Erhart et al. | |
| 2012/0187185 | A1 | | 7/2012 | Sayan | |
| 2012/0286031 | A1 | | 11/2012 | Rothschild | |
| 2012/0316950 | A1 | | 12/2012 | LaPorte et al. | |
| 2013/0092730 | A1 | * | 4/2013 | Blinbaum | 235/375 |
| 2013/0157760 | A1 | * | 6/2013 | Boudville | 463/31 |
| 2014/0026204 | A1 | * | 1/2014 | Buntinx | 726/9 |

OTHER PUBLICATIONS

Ching-Bang Yao, et al., Utilized QRCode and GPS to Construct a Customization service and Fast settlement Environment, Journal: Advanced Materials Research, Jun. 18-19, 2011, pp. 1341-1344, vols. 225-226, Trans Tech Publications, Switzerland.

Author Unknown, Method to avoid QR Code phishing based on context verification, Technical Disclosure IPCOM000224987D, Jan. 18, 2013, pp. 1-6, IP.com, Published online at: http://ip.com/IPCOM/000224987.

Author Unknown, Kuoob: Mobile Marketing & Mobile Advertising, Webpage/site, Printed from website on Aug. 7, 2013, pp. 1-3, 99squared Ltd., Published online at: http://www.squarecode.biz; or at: www.99squared.com.

(Continued)

*Primary Examiner* — Seung Lee
(74) *Attorney, Agent, or Firm* — Lee Law, PLLC; Christopher B. Lee

(57) ABSTRACT

A dynamic quick response (QR) code including an encoded unique value is displayed in association with an item displayed in a retail environment. A configured QR code change event is detected. Encoding of the dynamic QR code is changed to encode a new unique value. The new unique value is based upon a set of contemporaneous data elements associated with the item displayed in the retail environment. The encoded new unique value of the changed dynamic QR code is archived. The changed dynamic QR code including the encoded new unique value is displayed in association with the item displayed in the retail environment.

20 Claims, 5 Drawing Sheets

(56) References Cited

OTHER PUBLICATIONS

Author Unknown, Peartrack: Battery Powered Asset Monitoring and Tracking for Equipment, Containers, Freight and Trailers, Webpage/site, Printed from website on Aug. 7, 2013, p. 1, Pear Track, Published online at: www.peartrack.com.

Author Unknown, shopkick: treat yourself while shopping, Webpage/site, Printed from website on Aug. 7, 2013, pp. 1-2, shopkick, Inc., Published online at: www.shopkick.com.

Author Unknown, Austin businesses seek ways to thwart showrooming, Austin Business Journal, Aug. 3, 2012, p. 1, American City Business Journals, Published online at: http://www.bizjournals.com/austin/blog/morning_call/2012/08/austin-businesses-seek-ways-to-thwart.html.

Steven Trotter, et al., Trackable Dynamic QR Codes: TrakQR, Webpage/site, Printed from website on Aug. 7, 2013, pp. 1-4, Team Narwhal LLC, Published online at: www.trakqr.com.

\* cited by examiner

CREATION AND MANAGEMENT OF DYNAMIC QUICK RESPONSE (QR) CODES

BACKGROUND

The present invention relates to merchandise scan identification and correlation. More particularly, the present invention relates to creation and management of dynamic quick response (QR) codes.

The term "showrooming" refers to an action by a consumer, where the consumer examines merchandise in a brick and mortar retail store and scans a bar code or other merchandise identifier (e.g., manufacturer and/or model number) without purchasing the merchandise in the store. Certain consumers that engage in showrooming utilize the scanned information to learn more about the merchandise prior to purchasing the merchandise. Certain consumers also shop online to find a lower price for the same item of merchandise than the price offered in the retail store.

BRIEF SUMMARY

A method includes: displaying a dynamic quick response (QR) code comprising an encoded unique value in association with an item displayed in a retail environment; detecting a configured QR code change event; changing encoding of the dynamic QR code to encode a new unique value based upon a set of contemporaneous data elements associated with the item displayed in the retail environment; archiving the encoded new unique value of the changed dynamic QR code; and displaying the changed dynamic QR code comprising the encoded new unique value in association with the item displayed in the retail environment.

A system includes a memory, and a processor programmed to: display a dynamic quick response (QR) code comprising an encoded unique value in association with an item displayed in a retail environment; detect a configured QR code change event; change encoding of the dynamic QR code to encode a new unique value based upon a set of contemporaneous data elements associated with the item displayed in the retail environment; archive the encoded new unique value of the changed dynamic QR code in the memory; and display the changed dynamic QR code comprising the encoded new unique value in association with the item displayed in the retail environment.

A computer program product includes a computer readable storage medium having computer readable program code embodied therewith, where the computer readable program code when executed on a computer causes the computer to: display a dynamic quick response (QR) code comprising an encoded unique value in association with an item displayed in a retail environment; detect a configured QR code change event; change encoding of the dynamic QR code to encode a new unique value based upon a set of contemporaneous data elements associated with the item displayed in the retail environment; archive the encoded new unique value of the changed dynamic QR code; and display the changed dynamic QR code comprising the encoded new unique value in association with the item displayed in the retail environment.

DETAILED DESCRIPTION

Figure 1:
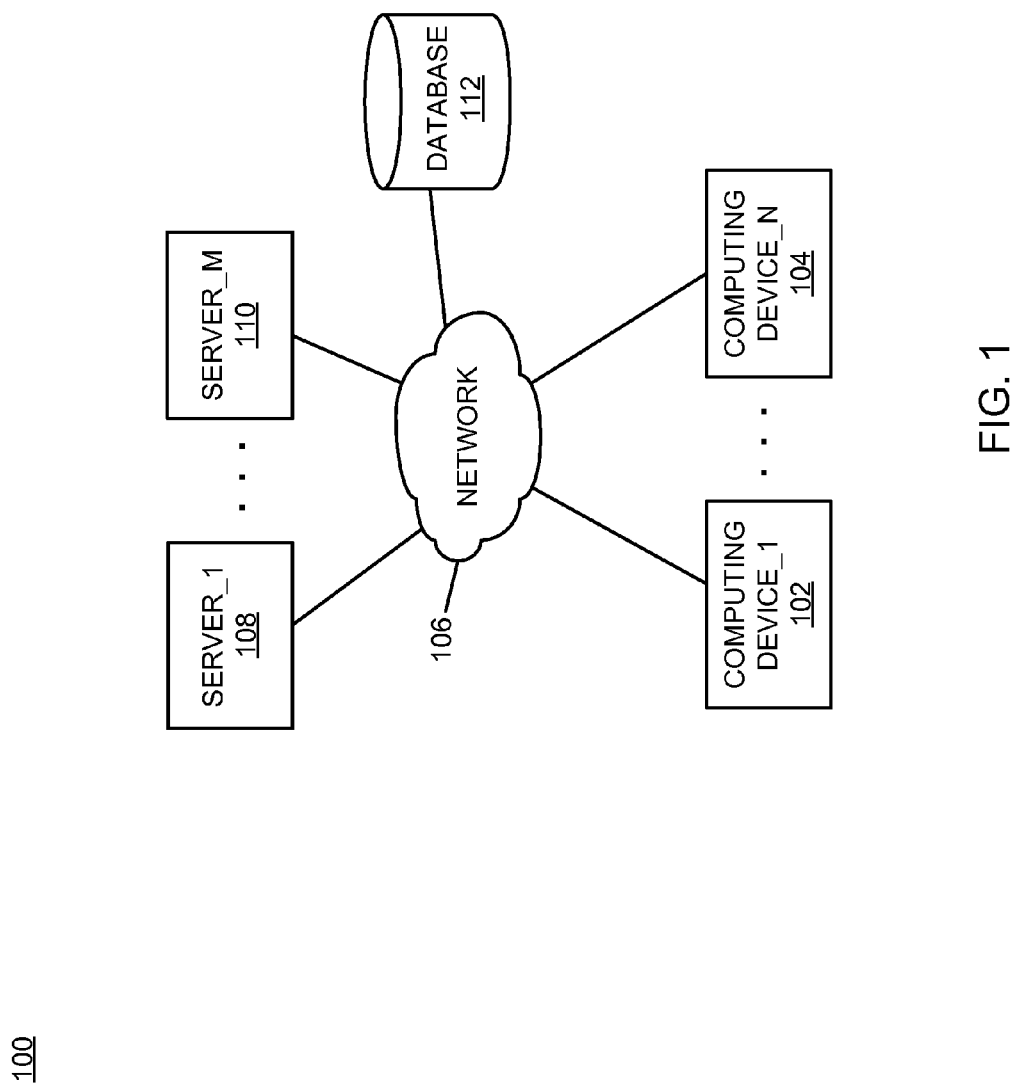
FIG. 1 is a block diagram of an example of an implementation of a system for creation and management of dynamic quick response (QR) codes according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides creation and management of dynamic quick response (QR) codes. A QR code displayed in association with an item may be encoded with a unique value. The unique value of the displayed QR code may change dynamically based upon an internal event or external event. An internal event that triggers a QR code change may include expiration of a configured duration of time that the QR code has been displayed without being changed, detection of a configured number of user scans of the displayed QR code, or other internally-tracked factor. An external event that triggers a QR code change may include a button push by a user to request a new user-specific QR code, a temperature change within a retail environment, or other configured external factor. As such, QR code values may be correlated with specific times and/or events. The unique value of the QR code associated with a particular time or event may be used to confirm and/or verify both the authenticity of a presented QR code and the QR code's correlation with the retail environment within which it was displayed, and may be used to verify that the user/device that presents the QR code is authorized to utilize the QR code.

The unique value of the displayed QR code may be derived from several contemporaneous data elements related to that item and the item location. The present technology uniquely identifies an item scan based upon the encoded contemporaneous data elements represented within the unique value of the displayed QR code. The contemporaneous data elements related to that item scan may be encoded in the dynamic QR code from a set of inputs or may be received from another device (e.g., from a server). The contemporaneous data elements may include, among other things, a scan location, a current scanned-item price, a temperature at a scan location, a consumer identifier of a consumer that is viewing/scanning the item, a current scan time, and other information as appropriate for a given implementation. As such, a product or service provider may utilize the present technology to enhance interaction with the consumer (the potential customer), and improved customer conversion, improved customer relations, and improved customer retention may be obtained by use of the present technology.

The changed value of the dynamic QR code may be derived from an encoded result set. The encoded result set may include one or a combination of the contemporaneous data elements related to the item scan and/or the item scan location/environment. The value of the dynamic QR code may be provided to the retailer. The retailer may decode the value of the dynamic QR code, and may utilize the decoded data to verify authenticity of the decoded value and to provide an incentive to the consumer that initiated the item scan. For example, the retailer may authenticate the date, time, and temperature within the retail environment, as well as other information decoded from the value of the dynamic QR code. The consumer may redeem the authenticated dynamic QR code to obtain the offered incentive.

The present technology may utilize a digital or ePaper display that renders/displays a changing or other form of the dynamic QR code. The value of the QR code may be rotated/changed at a specified interval via a user action (e.g., a push of a button to obtain a QR code, or a QR code that changes in response to detection of a flash exposure of a camera). Alternatively, the value of the QR code may be rotated/changed by other internal or external events (e.g., a temperature change, a signal from server to change the QR code, etc.) as appropriate for a given implementation. The consumer/user may scan the dynamic QR code with their handheld computing device to capture the contemporaneous image of the dynamic QR code. The scanned dynamic QR code may be redeemed for an incentive, such as a discount, shopping points, or other form of incentive, associated with purchase of the respective item of merchandise or service. As such, consumers that engage in showrooming may be incentivized into becoming a customer of the retail store by redeeming their incentive contemporaneously with their visit to the retail store or by redeeming their incentive at a later time as authorized and configured for the respective incentive.

The user may scan the dynamic QR code with a generic QR scanning system, with a camera, or with a camera associated with a handheld device (e.g., a smartphone). The dynamic QR code may be processed using an application on a client device. The application on the client device may be a part of a larger client-server system that includes processing capabilities for the rotating/dynamic QR code.

If the dynamic QR scan processing application is not part of a currently-accessible system, the user may retain the image on the handheld device and return to the store at a later time to claim an incentive by showing the scan at the register. If the dynamic QR scan processing application is part of the concurrently-accessible system (e.g., a retailer smartphone application or shopping coupon service), the user may be associated with the unique dynamic QR code by incorporation of user registration information with the respective service (e.g., dynamic QR code combined with user registration information). Additionally, for a kiosk-based implementation with offerings for multiple products, the consumer may push a button for a specific item and a dynamic custom QR code for that particular product that is encoded with a unique identifier may be generated on demand by the consumer.

The dynamic QR code may further be encoded to reference information in a database that stores the detailed information associated with the item scan. The information in the database may be the incentive that is configured for the respective dynamic QR code, a configured time period for redemption of the incentive, a maximum number of incentives that may be redeemed in association with the respective dynamic QR code, a user identifier of the consumer for which a single-use dynamic QR code has been created, or other information as appropriate for a given implementation.

Redemption of the dynamic QR code for the published incentive may be managed and tracked by retailers for a variety of benefits to both the consumers and the retailers. For example, a retailer may configure an authorized redemption period of time, such as thirty (30) days from the scan date. If the consumer presents a scan encoded within the thirty days prior to the time of redemption, the consumer may obtain the best available discounted price on a particular item that was offered within the last 30 days. Alternatively, a price lock incentive may be offered based upon a dynamic QR code scan time on a specific item for longer than a consumer is normally offered (e.g., sixty (60) days). Further, where a consumer has provided an email address, the dynamic QR codes may be configured to email a consumer within a configured redemption window if a price changes on an item they have scanned.

Additionally, because the consumer and all of the consumer's dynamic QR code scans are documented, the collection/set of scanned QR codes may be integrated together to offer additional incentives to consumers. For example, incentives may be bundled for items a consumer has specifically scanned based upon actual documented consumer interest in the set of scanned items. Further, the items may represent a set of unrelated items (e.g., a swim suit incentive, plus a gaming device inventive, plus a diapers incentive, etc.) that may otherwise not be capable of identification by retailers for incentive combinations. As such, actual targeted incentive clustering may be performed by use of the present technology. The targeted incentive clustering may further enhance customer conversion, customer relations, and customer retention.

Additionally, because the dynamic QR code may be encoded with a scan time and scan location, and with other information, the consumer is capable of documenting the item scan time and location, and the retailer may be confident that the consumer has actually returned to the retail store where the item scan occurred and that the best available discounted price is properly applied with respect to the time period relative to the item scan. Because the retailer is capable of interpreting the item scan, the consumer may display the image of the scan of the dynamic QR code to prove the consumer was in the store at the particular time of the scan.

It should be noted that several forms of QR code rotation techniques may be utilized where the dynamic QR code may be rotated/changed at a configured interval or event, as appropriate for a given implementation. For example, time-based QR code rotation may be configured to cause a particular QR code value to be displayed for a particular time period (e.g., one minute, one hour, one day, one week, etc.), after which the QR code value may be changed. Alternatively, user-based QR code rotation may be configured to cause a particular QR code value to be displayed for only one (1) person, such as by use of a push-button QR code rotation method.

Because dynamic QR codes as described herein are encoded with contemporaneous data elements related to that item scan, and because retailers may interpret the contemporaneous data elements, the retailers may regulate or limit a number of items sold against a particular scan value. For example, where user-based QR code rotation has been configured, a single redemption of the scanned dynamic QR code may be identified and a second attempted redemption of the scanned dynamic QR code may be flagged as an improper attempt at incentive redemption. Similar processing of other QR code rotation techniques may be utilized to regulate or limit incentive consumption and to identify improper use of incentives. As such, by use of QR code rotation techniques, such as the time-based QR code rotation or the user-based QR code rotation, retailers may limit abuse of QR-code-based offers/incentives and prevent these rotating/dynamic QR codes from being sold/exchanged in large volumes. The retailers may also be certain that the consumers that redeem dynamic QR-code-based incentives are the same consumers that the retailers were trying to incentivize to become customers (e.g., the previous showrooming consumer).

Retailers may also utilize the information obtained by redemption of the dynamic QR codes to perform several forms of verification. For example, verification of QR codes may be used to determine and evaluate factors, such as customer conversion rates, customer relation improvement rates, and customer retention rates, or other forms of statistical processing as appropriate for a given implementation.

The present technology may further be utilized to manage product/goods shipping and receiving by documentation of environmental factors in association with dynamic QR code generation. Additionally, packages and/or shipments may be tracked using the present technology.

For example, location-based technology, time-based technology, temperature-based technology, sun exposure-based technology, accelerometer-based technology, gyroscopic technology, and other forms of technology may be integrated to capture environmental information associated with a product. Dynamic QR codes may be created to document the captured environmental information.

To implement environmental factor documentation, the dynamic QR code may be changed based upon a time, a maximum temperature, a maximum humidity, sun exposure, or other factors that may affect the products/goods under shipment. As such, products that are required to be kept within temperature ranges during shipment may be confirmed to have been maintained within the required temperature range by the shipping company. Further, any deviations from required temperature ranges may be determined and documented. For example, using sun exposure-based technology, such as paper that is treated to change colors when exposed to a temperature increase or sun exposure beyond a threshold, a determination may be made as to whether a product under shipment has been left on a tarmac at an airport in the sun too long. Additionally, using accelerometer-based technology, a determination may be made as to whether a product was dropped during shipment. As another example, using gyroscopic technology, a determination may be made as to whether a product remained upright during shipping. Many other integrated forms of environmental factor documentation using the present technology are possible and all such forms of environmental factor documentation are considered within the scope of the present technology.

Further regarding shipment tracking using location-based technology and time-based technology, location-based departure and arrival times may be documented and encoded within a dynamic QR code. For example, a dynamic QR code change may be used to document a location and time when a package is shipped. This information may be provided to the respective consumer/recipient in advance to confirm shipment for the respective consumer/recipient. Similarly, a dynamic QR code change may be used to document a location and time when a package is delivered. This information may be provided to the respective shipper to confirm receipt of the respective shipment by the respective consumer/recipient. As such, location-based technology and time-based technology may be used to assist with shipment tracking.

Within the context of the present subject matter, the term "item" refers to anything that may be scanned, and may include a physical product on a store shelf, an offer for a product or service made to a consumer, a collection of items in transit, or other merchandise or offering that may be scanned. Additionally, the phrases "dynamic quick response code" and "dynamic QR code" as used herein refer to a QR code that is encoded with (or references) information that is updated in real time as a consumer interacts with an item within a retail environment. Additionally, the phrases "rotating QR code" and "dynamic QR code" may be considered interchangeable terms, and refer to QR codes that are encoded with different unique values over time to change the encoding of the dynamic/rotating QR code.

It should be noted that conception of the present subject matter resulted from recognition of certain limitations associated with retailers' attempts at prevention of item/merchandise scanning, termed "showrooming." For example, it was observed that many retail stores are engaging in tactics to try to prevent showrooming. It was observed that certain retail stores direct employees to talk to consumers that are believed to be showrooming and to try to encourage the purchase of the merchandise in the retail store. It was observed that other retail stores are trying to make it impossible to scan items by removing bar codes, by removing brand names, by removing model numbers, and by use of other tactics. However, it was determined that these tactics were ineffective and caused retail stores to loose consumer confidence. It was further determined that consumers are going to continue showrooming, and that technology to assist retailers with conversion and transformation of showrooming consumers into customers would benefit both retailers and consumers. The present subject matter improves conversion and transformation of showrooming consumers into customers by providing technology to uniquely identify an item scan based on several contemporaneous data elements related to the item, the consumer, and the location of the item scan. The present technology further provides for use of the scan-related data to enhance interaction with the showrooming consumer and transformation of the showrooming consumer into a customer, as described above and in more detail below. As such, improved customer conversion, improved customer relations, and improved customer retention may be obtained by use of the present technology.

The creation and management of dynamic quick response (QR) codes described herein may be performed in real time to allow prompt documentation and processing of merchandise scan-related data. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for creation and management of dynamic quick response (QR) codes. A computing device_1 102 through a computing device_N 104 communicate via a network 106 with several other devices. The other devices include a server_1 108 through a server_M 110. A database 112 stores dynamic QR code configuration and processing information.

As will be described in more detail below in association with FIG. 2 through FIG. 5, the computing device_1 102 through the computing device_N 104 in combination with one or more of the server_1 108 through the server_M 110 provide automated creation and management of dynamic quick response (QR) codes. As such, the present technology may be implemented at a user computing device or server device level. A variety of possibilities exist for implementation of the present subject matter, and all such possibilities are considered within the scope of the present subject matter.

The automated creation and management of dynamic quick response (QR) codes is based upon uniquely identifying an item scan based on several contemporaneous data elements related to the item, the consumer, and the location of the item scan. The automated creation and management of dynamic quick response (QR) codes is further based upon creating/updating a value of a dynamic QR code that documents the uniquely identified item scan. An incentive for the consumer is coupled to the dynamic QR code for redemption by the consumer using or in association with the created/updated value of the dynamic QR code. The retailer may decode the value of the dynamic QR code value to confirm that the intended consumer(s) is/are redeeming the incentive associated with the dynamic QR code.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The database 112 may include a relational database, an object database, or any other storage type of device. As such, the database 112 may be implemented as appropriate for a given implementation.

Figure 2:
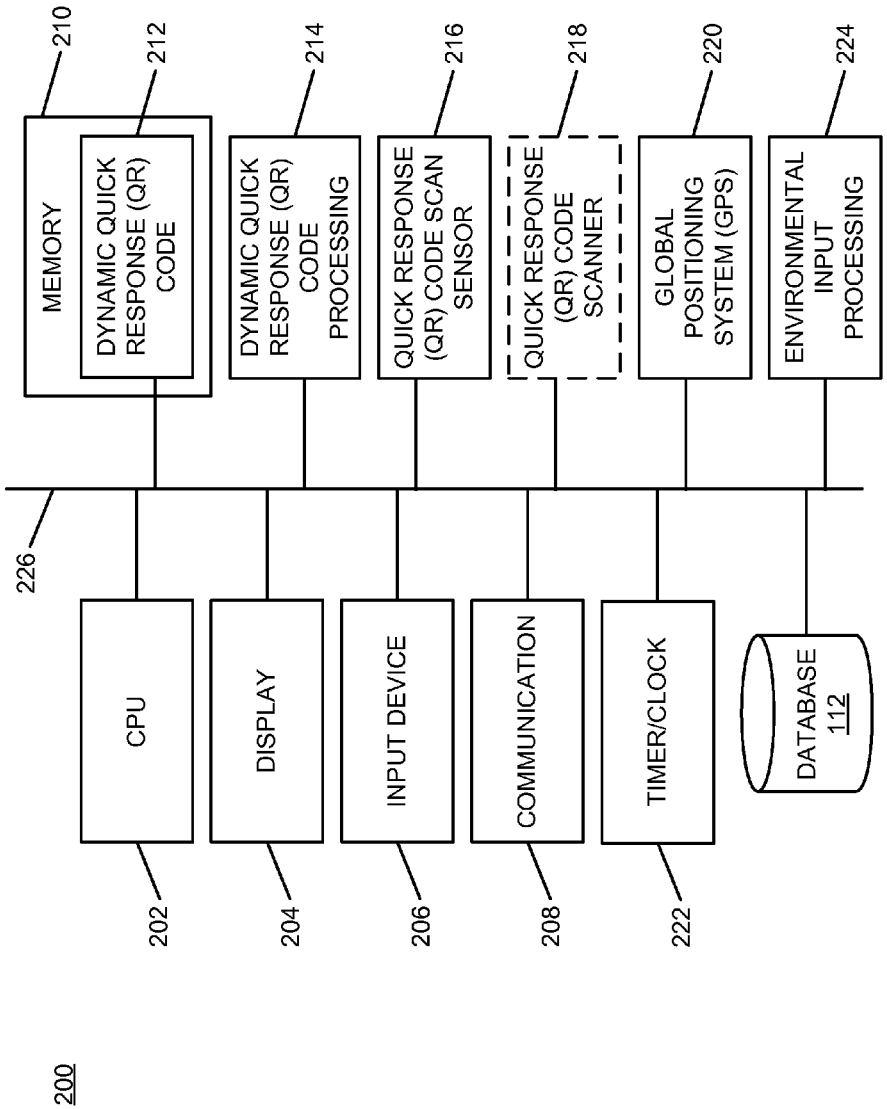
FIG. 2 is a block diagram of an example of an implementation of a core processing module capable of performing creation and management of dynamic quick response (QR) codes according to an embodiment of the present subject matter.

FIG. 2 is a block diagram of an example of an implementation of a core processing module 200 capable of performing creation and management of dynamic quick response (QR) codes. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of dynamic QR codes in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a dynamic quick response (QR) code storage and processing area 212 that stores contemporaneous data elements and other information within the core processing module 200. As will be described in more detail below, contemporaneous data elements and other information stored within the dynamic QR code storage and processing area 212 is used to dynamically change the value(s) associated with QR codes.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A dynamic quick response (QR) code processing module 214 is also illustrated. The dynamic QR code processing module 214 provides dynamic value generation, incentive association, and incentive redemption processing for the core processing module 200, as described above and in more detail below. The dynamic QR code processing module 214 implements the automated creation and management of dynamic quick response (QR) codes of the core processing module 200.

It should also be noted that the dynamic QR code processing module 214 may form a portion of other circuitry described without departure from the scope of the present subject matter. Further, the dynamic QR code processing module 214 may alternatively be implemented as an application stored within the memory 210. In such an implementation, the dynamic QR code processing module 214 may include instructions executed by the CPU 202 for performing the functionality described herein. The CPU 202 may execute these instructions to provide the processing capabilities described above and in more detail below for the core processing module 200. The dynamic QR code processing module 214 may form a portion of an interrupt service routine (ISR), a portion of an operating system, a portion of a browser application, or a portion of a separate application without departure from the scope of the present subject matter.

A quick response (QR) code scan sensor module 216 provides QR code scan detection capabilities in association with the core processing module 200. The QR code scan sensor module 216 may detect one or more scans of a displayed QR code. The dynamic QR code processing module 214 may process displayed QR code scans detected by the QR code scan sensor module 216, as described above and in more detail below.

A quick response (QR) code scanner module 218 provides QR code scanning in association with the core processing module 200. The QR code scanner module 218 may be a camera or other graphic input processing module, as appropriate for a given implementation. The dynamic QR code processing module 214 may process item scans generated by the QR code scanner module 218, as described above and in more detail below.

The QR code scanner module 218 is shown within FIG. 2 as a dashed-line module to represent that it may be associated, for example, with a handheld consumer device, but may optionally not be implemented on a version of the core processing module 200 that tracks scans of displayed QR codes. As such, the QR code scan sensor module 216 and the QR code scanner module 218 may be considered complementary devices usable to detect and scan, respectively, displayed QR codes.

A global positioning system (GPS) module 220 provides positioning location identification information usable for identifying a location of an item scan performed using the QR code scanner module 218. The location identification information generated by the GPS module 220 may include a retail store address, a retail store name, an isle and shelf location of the item scanned, longitude and latitude coordinates or other form of location information, as appropriate for a given implementation. The location identification information generated by the GPS module 220 may be stored within the dynamic QR code storage and processing area 212 for use by the QR code scanner module 218 to associate a location with an item scan.

A timer/clock module 222 is illustrated and used to determine timing and date information. As such, the QR code scanner module 218 may utilize information derived from the timer/clock module 222 for information processing activities, such to associate a time and/or date with an item scan, to determine a redemption time of an incentive relative to the time and/or date of an item scan, and other timing calculations as appropriate for a given implementation.

An environmental input processing module 224 is also illustrated and provides input data acquisition and input data processing capabilities for environmental inputs. As such, the environmental input processing module 224 may include a thermometer, a hygrometer, an accelerometer, a gyroscope, or any other environmental input useable in association with the present technology. The QR code scanner module 218 may utilize information derived from the environmental input processing module 224 for information processing activities, such a documenting a number of scans of a displayed QR code, determination of temperature and humidity in association with shipment tracking, a determination of acceleration regarding whether an item has been dropped, a determination of angular momentum regarding whether an item remained upright, and other environmental calculations as appropriate for a given implementation.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the dynamic QR code processing module 214, the QR code scan sensor module 216, the QR code scanner module 218, the GPS module 220, the timer/clock module 222, the environmental input processing module 224, and the database 112 are interconnected via an interconnection 226. The interconnection 226 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
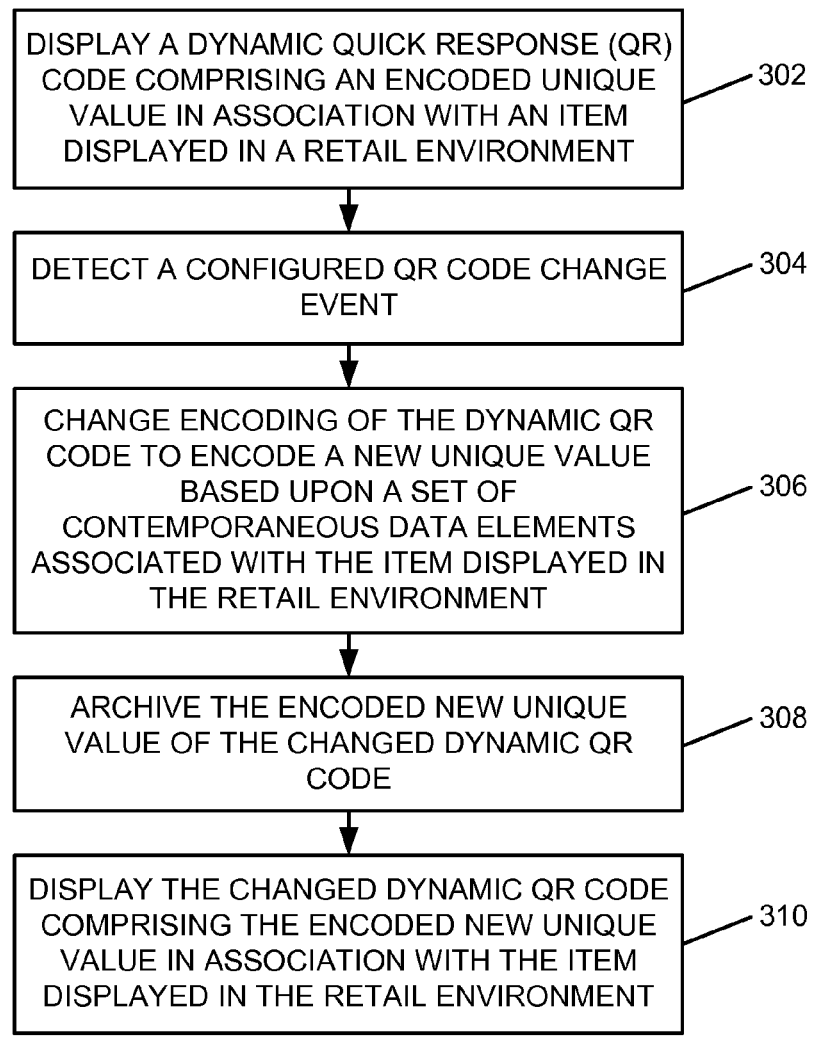
FIG. 3 is a flow chart of an example of an implementation of a process for creation and management of dynamic quick response (QR) codes according to an embodiment of the present subject matter.
Figure 4:
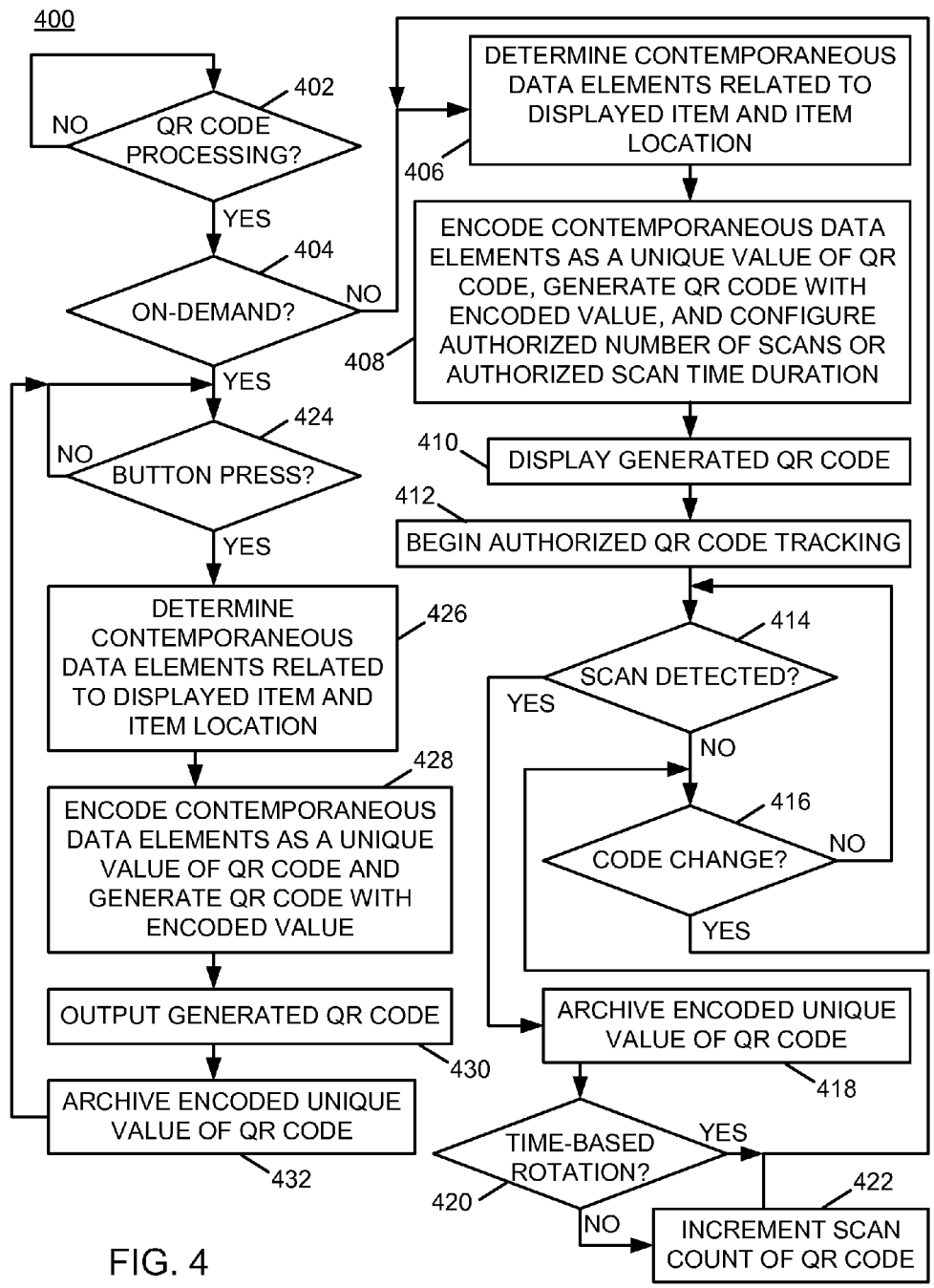
FIG. 4 is a flow chart of an example of an implementation of a process for creation of dynamic quick response (QR) codes according to an embodiment of the present subject matter.
Figure 5:
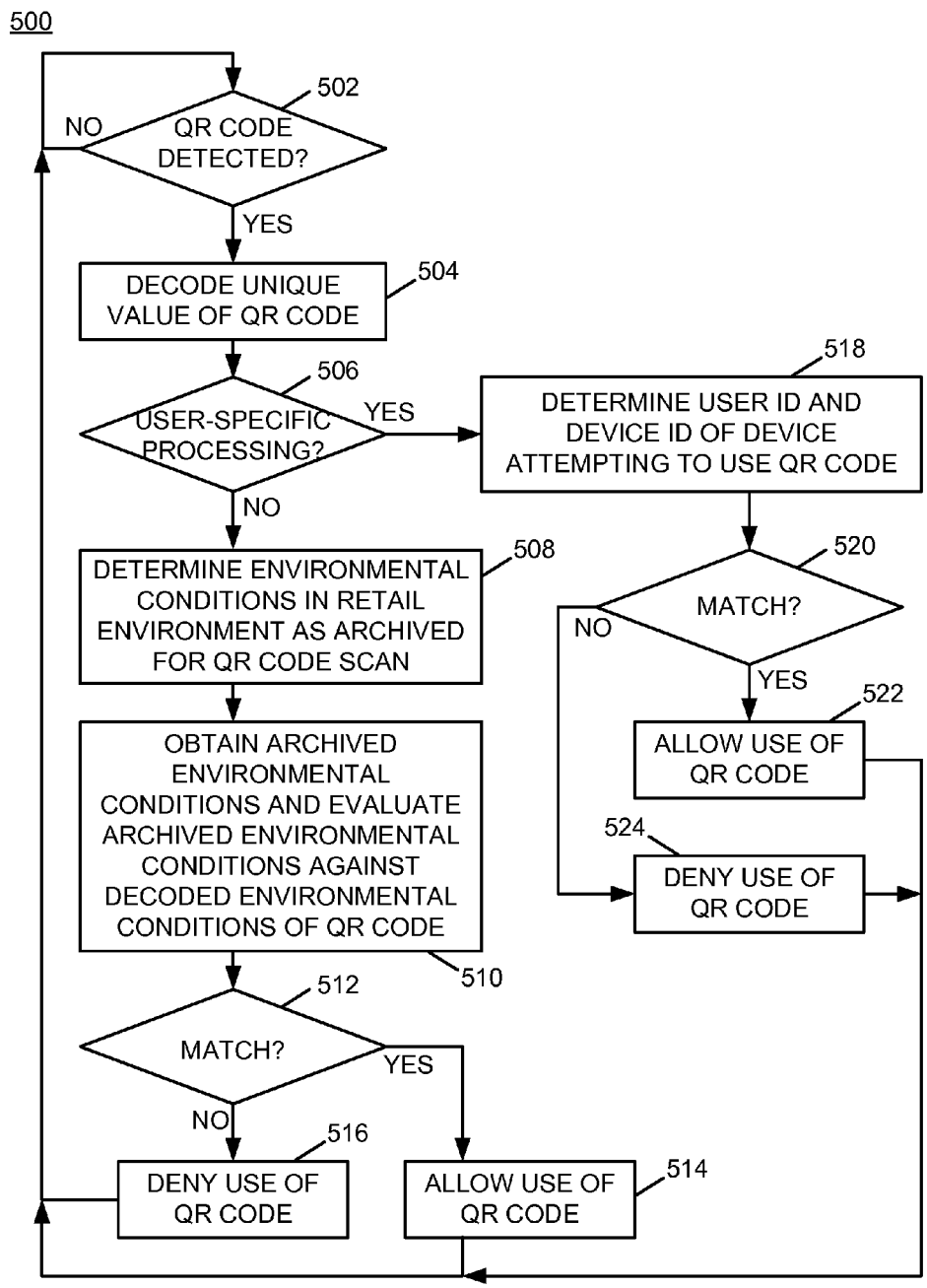
FIG. 5 is a flow chart of an example of an implementation of a process for management of dynamic quick response (QR) codes according to an embodiment of the present subject matter.

FIG. 3 through FIG. 5 described below represent example processes that may be executed by devices, such as the core processing module 200, to perform the automated creation and management of dynamic quick response (QR) codes associated with the present subject matter. Many other variations on the example processes are possible and all are considered within the scope of the present subject matter. The example processes may be performed by modules, such as the dynamic QR code processing module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for creation and management of dynamic quick response (QR) codes. At block 302, the process 300 displays a dynamic quick response (QR) code comprising an encoded unique value in association with an item displayed in a retail environment. At block 304, the process 300 detects a configured QR code change event. At block 306, the process 300 changes encoding of the dynamic QR code to encode a new unique value based upon a set of contemporaneous data elements associated with the item displayed in the retail environment. At block 308, the process 300 archives the encoded new unique value of the changed dynamic QR code. At block 310, the process 300 displays the changed dynamic QR code comprising the encoded new unique value in association with the item displayed in the retail environment.

FIG. 4 is a flow chart of an example of an implementation of a process 400 for creation of dynamic quick response (QR) codes. At decision point 402, the process 400 makes a determination as to whether to initiate QR code processing. It should be noted that QR code processing may be initiated in response to a variety of events, such as the opening of a business that displays items for purchase by customers. Alternatively, QR code processing may begin in response to any other event, as appropriate for a given implementation. In response to determining to initiate QR code processing, the process 400 makes a determination at decision point 404 as to whether to begin QR code processing in an on-demand QR code rotation mode. As described above, QR codes may be dynamically rotated/changed based upon on-demand events, such as button presses by customers, or may be dynamically rotated/changed based upon other factors or events, such as in response to detection of a user scan of a displayed QR code. On-demand QR code rotation will be described in more detail further below.

As such, in response to determining not to begin QR code processing in an on-demand QR code rotation mode, the process 400 determines contemporaneous data elements related to the displayed item and the item location at block 406. As described above, the contemporaneous data elements may include, among other things, a scan location, a current scanned-item price, a temperature at a scan location, a consumer identifier of a consumer viewing/scanning the item, a device identifier of the device that scanned QR code, a current scan time, a current humidity, and other information as appropriate for a given implementation.

At block 408, the process 400 encodes the contemporaneous data elements as a unique value of the QR code, generates the QR code with the encoded value, and configures either an authorized number of consumer device scans of the dynamic QR code and/or configures an authorized time duration for consumer devices to scan the dynamic QR code. At block 410, the process 400 displays the generated QR code. For example, the process 400 may display the generated QR code that includes the encoded unique value in association with an item displayed in a retail environment, such as on a display device or display panel associated with a displayed item.

At block 412, the process 400 begins authorized QR code scanning and/or time tracking. For example, the process 400 may track a number of detected scans of the first QR code by different consumer devices, and may change/rotate the QR code in response to a variety of factors, such as a configured authorized number of scans of the displayed QR code as described above and in more detail below. Alternative or additionally, the QR code with the encoded unique value may be displayed in association with the item displayed in the retail environment for a configured authorized time duration prior to rotating/changing the encoding of the displayed QR code and the process 400 may track the configured authorized time duration for consumer devices to scan the dynamic QR code, and may change/rotate the QR code in response to determining the configured authorized time duration for consumer devices to scan the dynamic QR code has expired. Both alternatives are shown and described in association with the process 400, though either alternative may be selected for a given implementation as appropriate.

At decision point 414, the process 400 makes a determination as to whether a consumer device scan of the displayed QR code has been detected. Detection of a scan of the displayed QR code may be performed, for example, by use of a flash sensor, use of image recognition of a user with a smartphone or camera scanning the QR code, or otherwise as appropriate for a given implementation, such as configured in association with the QR code scan sensor 216 described above.

In response to determining that no scan of the displayed QR code has been detected, the process 400 makes a determination at decision point 416 as to whether to change (e.g., rotate) the displayed QR code to encode a new unique value. The determination as to whether to change/rotate the displayed QR code to encode a new unique value may be made, for example, either in response to a detection of a configured authorized number of consumer device scans of the QR code or in response to a configured authorized time duration for consumer devices to scan the dynamic QR code elapsing within the present example, though it should be noted that other factors may be utilized as appropriate for a given implementation. In response to determining not to change (e.g., rotate) the displayed QR code to encode a new unique value, the process 400 returns to decision point 414 and iterates as described above. Initially prior to any detected scans of the QR code, it may be assumed that the QR code is not changed at least until a certain pre-configured amount of display time of the QR code has elapsed.

Returning to the description of decision point 414, in response to determining that a consumer device scan of the displayed QR code has been detected, the process 400 archives the encoded unique value of the displayed QR code at block 418. It should be noted that archiving the encoded unique value of the displayed QR code captures the contemporaneous data elements related to that detected scan of the QR code by the consumer device that have been encoded into the QR code, and may result in archiving of additional information. These encoded contemporaneous data elements and additional information may include a scan location, a current scanned-item price, a temperature at a scan location, a consumer identifier of a consumer viewing/scanning the item, a device identifier of the device that scanned a first QR code, a current scan time, or other information as appropriate for a given implementation.

As also described above, archiving the encoded unique value of the displayed QR code provides documentation of the detected scan of the QR code by the consumer device. The process 400 may further archive a user identifier of a user and/or a device identifier associated with the specific consumer device that scanned the first QR code (e.g., by communication with the device, by user input, etc.). Additionally, for user-based scan count processing, the process 400 may archive a scan count associated with the individual scan for later verification, as described below in association with FIG. 5.

As such, by archiving the encoded unique value of the displayed QR code, redemption or use of the scanned QR code may be correlated with the time and/or location (e.g., retail environment) and other factors associated with the retail environment where the QR code scan occurred. Additional details of use of the scanned QR code and related processing are described below in association with FIG. 5.

At decision point 420, the process 400 makes a determination as to whether time-based rotation has been configured for the displayed QR code (or alternatively whether user-based scan count rotation has been configured). In response to determining that time-based rotation has not been configured for the displayed QR code (and that user-based scan count rotation has been configured), the process 400 increments a scan count of the displayed QR code at block 422. In response to incrementing the scan count of the displayed QR code at block 422, or in response to determining that time-based rotation has been configured for the displayed QR code (and that user-based scan count rotation has not been configured) at decision point 420, the process 400 returns to decision point 416 to again determine whether to change the encoding of the displayed QR code, and iterates as described above.

As such, the process 400 may track/monitor both time and scan count and may determine to change the encoding of the displayed QR code in response to either time-based factors or user-based scan count. In response to determining at decision point 416 to change (e.g., rotate) the displayed QR code to encode a new unique value, the process 400 returns to block 406 to determine new contemporaneous data elements related to the displayed item and item location (e.g., a new time, new temperature, etc.). The process 400 iterates as described above to generate a new encoding of the contemporaneous data elements related to the displayed item and item location, and displays a newly-encoded QR code. Accordingly, the process 400 may dynamically change a displayed QR code and QR code encoding over time and in response to consumer actions associated with displayed QR codes. Though not illustrated within FIG. 4 due to drawing space limitations, the process 400 may determine to stop processing and tracking of displayed QR codes, such as at an end of retail business hours, as appropriate for a given implementation and may re-initiate QR code processing from decision point 402 at a subsequent time.

Returning to the description of decision point 404, in response to determining to begin QR code processing in an on-demand QR code rotation mode, the process 400 makes a determination as to whether a button press of a button associated with the displayed item has been detected at decision point 424. The process 400 may, for example, detecting a push-button event associated with the item displayed in a retail environment. As described above, a button press or other factor may be utilized to generate a QR encoding on-demand. Though button press detection is utilized for purposes of example, other inputs may be utilized as appropriate for a given implementation (e.g., a user touch sensed on a capacitive touch display screen, etc.).

In response to determining that a button press of a button associated with the displayed item has been detected at decision point 424, the process 400 determines contemporaneous data elements related to the displayed item and the item location at block 426. As described above, the contemporaneous data elements may include, among other things, a scan location, a current scanned-item price, a temperature at a scan location, a current scan time, and other factors. Additionally, with the on-demand processing (or the time-based or user-based processing described above), a consumer identifier of a consumer viewing/scanning the item, a device identifier of the device that scanned first QR code, and other information may be encoded as appropriate for a given implementation, to create a user-specific QR code.

At block 428, the process 400 encodes the contemporaneous data elements as a unique value of the QR code and generates the QR code with the encoded value. As such, the process 400 may generate the QR code on-demand in response to detecting a push-button event associated with the item displayed in a retail environment.

At block 430, the process 400 outputs the generated QR code. For example, the process 400 may display the generated quick response (QR) code that includes the encoded unique value in association with an item displayed in a retail environment, such as on a display device or display panel associated with a displayed item, so that the requesting user may scan the displayed QR code. Alternatively, the process 400 may print the on-demand generated QR code for the requesting consumer or may transmit the on-demand generated QR code to the consumer (e.g., to the consumer's handheld device, smartphone, etc.).

At block 432, the process 400 archives the encoded unique value of the displayed QR code. Similar to the description above, archiving the encoded unique value of the on-demand QR code captures the contemporaneous data elements related to that retail environment for correlation with the on-demand QR code request of the consumer. As also described above, archiving the encoded unique value of the displayed QR code provides documentation of the QR code provided to the consumer device. The process 400 returns to decision point 424 and iterates as described above to process additional button presses associated with on-demand requests for QR code generation. As with the processing described above, though not illustrated within FIG. 4 due to drawing space limitations, the process 400 may determine to stop processing on-demand QR codes, such as at an end of retail business hours, as appropriate for a given implementation and may re-initiate QR code processing from decision point 402 at a subsequent time.

As such, the process 400 provides time-based, user-based scan count, and on-demand processing for dynamic rotation of QR codes and QR code encoding. The process 400 may change the encoding of a displayed QR code to encode the new unique value in response to expiration of the pre-configured time duration. Such a pre-configured time duration may be used to regulate a number of consumers capable of redeeming an incentive promoted during the pre-configured time duration. Alternatively, the process 400 may change the encoding of a displayed QR code to encode the new unique value in response to determining that a given scan of the QR code by a consumer device results in the configured number of consumer device scans of the first QR code. Such a configured number of consumer devices that scanned the QR code may be used to regulate a number of consumers that scan the displayed first QR code based upon actual scans of the QR code (e.g., a scan count rather than time allotment). The process 400 may also alternatively perform on-demand encoding and generation of QR codes. This form of processing may be utilized to further individualize QR code generation for individual consumers.

FIG. 5 is a flow chart of an example of an implementation of a process 500 for management of dynamic quick response (QR) codes. At decision point 502, the process 500 makes a determination as to whether presentation of a QR code by a consumer has been detected. As such, the process 500 may detect an attempted use or redemption of a QR code. For example, a user that scanned or otherwise received a generated QR code may attempt to redeem or otherwise utilize the QR code, and such use may be detected, such as at a point of sale (POS) terminal or otherwise as appropriate for a given implementation. In response to determining that presentation of a QR code by a consumer has been detected, the process 500 decodes the unique value encoded by the presented QR code at block 504. The process 500 may decode a unique value of the QR code to, for example, obtain environmental conditions of the retail environment encoded in the unique value of the QR code.

At decision point 506, the process 500 makes a determination as to whether to perform user-specific processing of the presented QR code (or alternatively whether to use environmental conditions processing of the presented QR code). This determination may be made, for example, based upon whether one or more user-specific identifiers (e.g., a user identifier and/or a user-specific device identifier) were decoded from the presented QR code. In response to determining not to perform user-specific processing of the presented QR code (and to instead use environmental conditions processing of the presented QR code), the process 500 determines the environmental conditions in the retail environment as archived for the QR code scan at block 508. At block 510, the process 500 obtains archived environmental conditions archived for the decoded QR code, and evaluates the obtained archived environmental conditions against the decoded contemporaneous environmental conditions of the presented QR code.

At decision point 512, the process 500 makes a determination as to whether the archived environmental conditions match the decoded environmental conditions. As described above, the environmental conditions may include several factors associated with the retail environment, a user or device associated with the scan, and a scan count associated with the individual scan. As such, the process 500 may determine whether each of these respective environmental factors match between the archived and decoded QR codes.

In response to determining that the archived environmental conditions match the decoded environmental conditions, the process 500 allows use of the presented QR code at block 514. Alternatively, in response to determining that the archived environmental conditions do not match the decoded environmental conditions, the process 500 denies use of the presented QR code at block 516. In response to the processing at either block 514 or block 516, the process 500 returns to decision point 502, and iterates as described above.

Returning to the description of decision point 506, in response to determining to perform user-specific processing of the presented QR code (and not to use environmental conditions processing of the presented QR code), the process 500 determines a user identifier (ID) and device identifier (ID) of a device that is attempting to use the presented QR code at block 518. At decision point 520, the process 500 makes a determination as to whether the determined user ID and device ID match a user ID and device ID decoded from the presented QR code. As such, correlation and authentication of presentation of QR codes may be performed.

In response to determining that the determined user ID and device ID match a user ID and device ID decoded from the presented QR code, the process 500 allows use of the presented QR code at block 522. Alternatively, in response to determining that the determined user ID and device ID do not match a user ID and device ID decoded from the presented QR code, the process 500 denies use of the presented QR code at block 524. In response to the processing at either block 522 or block 524, the process 500 returns to decision point 502, and iterates as described above.

As such, the process 500 manages dynamically created QR codes. The process 500 performs verification of environmental conditions decoded from presented QR codes against environmental conditions archived in association with QR code generation/rotation. The process 500 also verifies user and device identifiers decoded from presented QR codes against user and device identifiers archived in association with scanned QR codes. Accordingly, QR code use count limits and user-specific QR code creation may be correlated and managed within a retail environment.

As described above in association with FIG. 1 through FIG. 5, the example systems and processes provide creation and management of dynamic quick response (QR) codes. Many other variations and additional activities associated with creation and management of dynamic quick response (QR) codes are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
by a processor:
displaying a dynamic quick response (QR) code comprising an encoded unique value in association with an item displayed in a retail environment;
detecting a configured QR code change event;

changing encoding of the dynamic QR code to encode a new unique value based upon a set of contemporaneous data elements associated with the item displayed in the retail environment;

archiving the encoded new unique value of the changed dynamic QR code; and displaying the changed dynamic QR code comprising the encoded new unique value in association with the item displayed in the retail environment.

2. The method of claim 1, where:

the processor detecting the configured QR code change event comprises the processor detecting a push-button event associated with the item displayed in the retail environment; and the processor changing the encoding of the dynamic QR code to encode the new unique value based upon the set of contemporaneous data elements comprises the processor encoding the new unique value based upon a set of contemporaneous data elements derived from a current location of the item displayed in the retail environment, a current temperature within the retail environment, a current time, and a current date.

3. The method of claim 1, further comprising the processor:

configuring an authorized number of consumer device scans of the dynamic QR code that comprises the encoded unique value;

tracking a number of detected scans of the dynamic QR code by different consumer devices within the retail environment; and where the processor detecting the configured QR code change event comprises the processor determining that the number of detected scans of the dynamic QR code by the different consumer devices results in the configured authorized number of consumer device scans of the dynamic QR code.

4. The method of claim 1, further comprising the processor:

configuring an authorized time duration for consumer devices to scan the dynamic QR code that comprises the encoded unique value;

tracking an amount of elapsed time during the display of the dynamic QR code; and where the processor detecting the configured QR code change event comprises the processor determining that the configured authorized time duration for the consumer devices to scan the dynamic QR code has expired.

5. The method of claim 1, further comprising the processor:

detecting a scan of the changed dynamic QR code by a first consumer device within the retail environment;

archiving a user identifier and a device identifier associated with the first consumer device that scanned the changed dynamic QR code with the archived encoded new unique value of the changed dynamic QR code;

detecting an attempted use of the scanned changed dynamic QR code;

determining a user identifier and device identifier associated with a consumer device attempting to use the scanned changed dynamic QR code;

obtaining the archived user identifier and device identifier associated with the first consumer device that scanned the changed dynamic QR code; and determining whether the archived user identifier and device identifier associated with the first consumer device that scanned the changed dynamic QR code match the respective user identifier and device identifier associated with the consumer device attempting to use the scanned changed dynamic QR code.

6. The method of claim 5, further comprising the processor:

allowing use of the scanned changed dynamic QR code in response to determining that the archived user identifier and device identifier associated with the first consumer device that scanned the changed dynamic QR code match the respective user identifier and device identifier associated with the consumer device attempting to use the scanned changed dynamic QR code; and denying use of the scanned changed dynamic QR code in response to determining that the archived user identifier and device identifier associated with the first consumer device that scanned the changed dynamic QR code do not match the respective user identifier and device identifier associated with the consumer device attempting to use the scanned changed dynamic QR code.

7. The method of claim 1, where the set of contemporaneous data elements associated with the item displayed in the retail environment comprises:

data elements selected from a group consisting of a current location of the item displayed in the retail environment, a current temperature at the current location of the item displayed in the retail environment, a current time, a current date, a current scanned-item price, a user identifier of a user, and a device identifier of a consumer device of the user.

8. A system, comprising:

a memory; and a processor programmed to:

display a dynamic quick response (QR) code comprising an encoded unique value in association with an item displayed in a retail environment;

detect a configured QR code change event;

change encoding of the dynamic QR code to encode a new unique value based upon a set of contemporaneous data elements associated with the item displayed in the retail environment;

archive the encoded new unique value of the changed dynamic QR code in the memory; and display the changed dynamic QR code comprising the encoded new unique value in association with the item displayed in the retail environment.

9. The system of claim 8, where, in being programmed to:

detect the configured QR code change event, the processor is programmed to detect a push-button event associated with the item displayed in the retail environment; and change the encoding of the dynamic QR code to encode the new unique value based upon the set of contemporaneous data elements, the processor is programmed to encode the new unique value based upon a set of contemporaneous data elements derived from a current location of the item displayed in the retail environment, a current temperature within the retail environment, a current time, and a current date.

10. The system of claim 8, where the processor is further programmed to:

configure an authorized number of consumer device scans of the dynamic QR code that comprises the encoded unique value;

track a number of detected scans of the dynamic QR code by different consumer devices within the retail environment; and where, in being programmed to detect the configured QR code change event, the processor is programmed to determine that the number of detected scans of the dynamic QR code by the different consumer devices results in the configured authorized number of consumer device scans of the dynamic QR code.

11. The system of claim 8, where the processor is further programmed to:
   configure an authorized time duration for consumer devices to scan the dynamic QR code that comprises the encoded unique value;
   track an amount of elapsed time during the display of the dynamic QR code; and
   where, in being programmed to detect the configured QR code change event, the processor is programmed to determine that the configured authorized time duration for the consumer devices to scan the dynamic QR code has expired.

12. The system of claim 8, where the processor is further programmed to:
   detect a scan of the changed dynamic QR code by a first consumer device within the retail environment;
   archive a user identifier and a device identifier associated with the first consumer device that scanned the changed dynamic QR code with the archived encoded new unique value of the changed dynamic QR code in the memory;
   detect an attempted use of the scanned changed dynamic QR code;
   determine a user identifier and device identifier associated with a consumer device attempting to use the scanned changed dynamic QR code;
   obtain the archived user identifier and device identifier associated with the first consumer device that scanned the changed dynamic QR code from the memory;
   determine whether the archived user identifier and device identifier associated with the first consumer device that scanned the changed dynamic QR code match the respective user identifier and device identifier associated with the consumer device attempting to use the scanned changed dynamic QR code;
   allow use of the scanned changed dynamic QR code in response to determining that the archived user identifier and device identifier associated with the first consumer device that scanned the changed dynamic QR code match the respective user identifier and device identifier associated with the consumer device attempting to use the scanned changed dynamic QR code; and
   deny use of the scanned changed dynamic QR code in response to determining that the archived user identifier and device identifier associated with the first consumer device that scanned the changed dynamic QR code do not match the respective user identifier and device identifier associated with the consumer device attempting to use the scanned changed dynamic QR code.

13. The system of claim 8, where the set of contemporaneous data elements associated with the item displayed in the retail environment comprises:
   data elements selected from a group consisting of a current location of the item displayed in the retail environment, a current temperature at the current location of the item displayed in the retail environment, a current time, a current date, a current scanned-item price, a user identifier of a user, and a device identifier of a consumer device of the user.

14. A computer program product, comprising:
   a computer readable storage medium having computer readable program code embodied therewith, where the computer readable program code when executed on a computer causes the computer to:
   display a dynamic quick response (QR) code comprising an encoded unique value in association with an item displayed in a retail environment;
   detect a configured QR code change event;
   change encoding of the dynamic QR code to encode a new unique value based upon a set of contemporaneous data elements associated with the item displayed in the retail environment;
   archive the encoded new unique value of the changed dynamic QR code; and
   display the changed dynamic QR code comprising the encoded new unique value in association with the item displayed in the retail environment.

15. The computer program product of claim 14, where, in causing the computer to:
   detect the configured QR code change event, the computer readable program code when executed on the computer causes the computer to detect a push-button event associated with the item displayed in the retail environment; and
   change the encoding of the dynamic QR code to encode the new unique value based upon the set of contemporaneous data elements, the computer readable program code when executed on the computer causes the computer to encode the new unique value based upon a set of contemporaneous data elements derived from a current location of the item displayed in the retail environment, a current temperature within the retail environment, a current time, and a current date.

16. The computer program product of claim 14, where the computer readable program code when executed on the computer further causes the computer to:
   configure an authorized number of consumer device scans of the dynamic QR code that comprises the encoded unique value;
   track a number of detected scans of the dynamic QR code by different consumer devices within the retail environment; and
   where, in causing the computer to detect the configured QR code change event, the computer readable program code when executed on the computer causes the computer to determine that the number of detected scans of the dynamic QR code by the different consumer devices results in the configured authorized number of consumer device scans of the dynamic QR code.

17. The computer program product of claim 14, where the computer readable program code when executed on the computer further causes the computer to:
   configure an authorized time duration for consumer devices to scan the dynamic QR code that comprises the encoded unique value;
   track an amount of elapsed time during the display of the dynamic QR code; and
   where, in causing the computer to detect the configured QR code change event, the computer readable program code when executed on the computer causes the computer to determine that the configured authorized time duration for the consumer devices to scan the dynamic QR code has expired.

18. The computer program product of claim 14, where the computer readable program code when executed on the computer further causes the computer to:
   detect a scan of the changed dynamic QR code by a first consumer device within the retail environment;
   archive a user identifier and a device identifier associated with the first consumer device that scanned the changed dynamic QR code with the archived encoded new unique value of the changed dynamic QR code;
   detect an attempted use of the scanned changed dynamic QR code;

determine a user identifier and device identifier associated with a consumer device attempting to use the scanned changed dynamic QR code;

obtain the archived user identifier and device identifier associated with the first consumer device that scanned the changed dynamic QR code; and determine whether the archived user identifier and device identifier associated with the first consumer device that scanned the changed dynamic QR code match the respective user identifier and device identifier associated with the consumer device attempting to use the scanned changed dynamic QR code.

19. The computer program product of claim 18, where the computer readable program code when executed on the computer further causes the computer to:

allow use of the scanned changed dynamic QR code in response to determining that the archived user identifier and device identifier associated with the first consumer device that scanned the changed dynamic QR code match the respective user identifier and device identifier associated with the consumer device attempting to use the scanned changed dynamic QR code; and deny use of the scanned changed dynamic QR code in response to determining that the archived user identifier and device identifier associated with the first consumer device that scanned the changed dynamic QR code do not match the respective user identifier and device identifier associated with the consumer device attempting to use the scanned changed dynamic QR code.

20. The computer program product of claim 14, where the set of contemporaneous data elements associated with the item displayed in the retail environment comprises:

data elements selected from a group consisting of a current location of the item displayed in the retail environment, a current temperature at the current location of the item displayed in the retail environment, a current time, a current date, a current scanned-item price, a user identifier of a user, and a device identifier of a consumer device of the user.

* * * * *